United States Patent [19]

Ando

[11] Patent Number: 5,078,512

[45] Date of Patent: Jan. 7, 1992

[54] UNIDIRECTIONAL MODE CONVERTER AND OPTICAL ISOLATOR USING SAME

[75] Inventor: Koji Ando, Tsukuba, Japan

[73] Assignee: Agency of Industrial Science & Technology, Ministry of International Trade & Industry, Tokyo, Japan

[21] Appl. No.: 658,305

[22] Filed: Feb. 20, 1991

[30] Foreign Application Priority Data

Apr. 4, 1990 [JP] Japan ..................................... 2-89807

[51] Int. Cl.⁵ .......................... G02B 6/10; G02B 5/30; G02F 1/00
[52] U.S. Cl. ......................................... 385/11; 385/47; 385/131; 359/280; 359/282; 359/109
[58] Field of Search ............... 350/96.11, 96.12, 96.13, 350/96.14, 96.15, 375, 377; 455/602; 250/551

[56] References Cited

U.S. PATENT DOCUMENTS

| | | | |
|---|---|---|---|
| 3,995,936 | 12/1976 | Hepner et al. | 350/96.34 |
| 4,575,179 | 3/1986 | Lee et al. | 350/96.13 |
| 4,707,058 | 11/1987 | Tolksdorf et al. | 350/96.12 |
| 4,712,855 | 12/1987 | Tolksdorf et al. | 350/96.12 |
| 4,859,014 | 8/1989 | Schmitt et al. | 350/96.13 |
| 4,877,298 | 10/1989 | Teng et al. | 350/96.14 |
| 4,898,440 | 2/1990 | Tamada et al. | 350/96.13 |
| 4,973,119 | 11/1990 | Taki | 350/96.13 |

OTHER PUBLICATIONS

Applied Physics Letters, vol. 53, Jul. 4, 1988, No. 1, pp. 4–6, K. Ando et al., "Waveguide Magneto-Optic Isolator Fabricated by Laser Annealing".

Applied Optics, vol. 26, No. 18, Sep. 15, 1987, pp. 3811–3817, H. Hemme et al., "Optical Isolator Based on Mode Conversion in Magnetic Garnet Films".

*Primary Examiner*—Brian Healy
*Attorney, Agent, or Firm*—Oblon, Spivak, McClelland, Maier & Neustadt

[57] ABSTRACT

An optical isolator in which a mirror is arranged in the waveguide path to provide Fresnel reflection of the propagating light and change the light path direction by 90 degrees, the light path from the waveguide input plane to the mirror forms a first region in which magneto-optic-induced non-reciprocal mode conversion takes place, and the part of the light path from the mirror to the waveguide output plane forms a second region in which reciprocal mode conversion takes place, and mode selectors or polarizers are provided at the light input and output planes.

6 Claims, 2 Drawing Sheets

UNIDIRECTIONAL MODE CONVERTER AND OPTICAL ISOLATOR USING SAME

BACKGROUND OF THE INVENTION

1. Field of the Invention

The present invention relates to a unidirectional mode converter and an optical isolator that uses the unidirectional mode converter and which forms an essential element in optical communication systems and other such optical applications systems.

2. Prior Art Statement

Conventional optical isolators have been formed of glass for visible region types and yttrium-iron-9arnet single crystal for near-infrared types. For conventional communication systems, waveguide type optical isolators are considered to be most advantageous in terms of compactness and low cost.

The conventional basic arrangement and working principle of a waveguide isolator will now described with reference to FIG. 3. Essentially, this type of optical isolator is a unidirectional optical path along which the light is allowed to propagate within a waveguide path 2 formed on a substrate 1 in a prescribed direction, for example from the input plane 3 on the left towards the output plane 4 on the right, but cannot travel in the reverse direction.

To achieve this in the conventional arrangement, as in the optical isolator shown in FIG. 3, the waveguide path 2 is an optically permeable magneto-optic thin film in which first and second regions $a_1$ and $a_2$ are formed in tandem along the direction of propagation of forward input light Ii entering from an input plane 3. In the first region $a_1$ the Faraday effect observed when the direction of magnetization $f_1$ is parallel to the light propagation direction causes the input light Ii to undergo non-reciprocal mode conversion, and in the second region $a_2$ the Cotton-Mouton effect observed when the direction of magnetization $f_2$ is perpendicular to the light propagation direction causes the input light Ii to undergo reciprocal mode conversion. Also, formed on the waveguide path 2 in the vicinity of the input and output planes 3 and 4 are transmission mode polarizers or mode selectors 5 and 6 comprised of metal cladding layers.

The basic operation of this optical isolator is as follows. The forward input light Ii enters the waveguide path 2 via the input plane 3 and via the mode selector 5, which transmits only the TE-mode component, enters the non-reciprocal mode conversion first region $a_1$ where the polarization plane is rotated 45 degrees. However, as this rotation is canceled by the following reciprocal mode conversion second region $a_2$, the input light Ii reverts to the TE mode and can therefore be output from the output plane 4 as forward output light Io.

The mode selector 6 located by the output plane 4 causes undesirable optical noise Ii', such as reflected output light Io, for example, to be transmitted to the waveguide path 2 as TE-mode light, which undergoes TM-mode conversion from its passage through the reciprocal mode conversion second region $a_2$ and the non-reciprocal mode conversion first region $a_1$, thereby preventing it from passing through the mode selector 5 or, if the mode selector 5 is metal-clad, is absorbed, but whichever the case the result is that output of this optical noise from the input plane 3 is suppressed.

From the above explanation, it can be seen that without the mode selectors 5 and 6 the arrangement would function as a unidirectional mode converter.

Thus, in the above conventional optical isolator, the isolation of the output light Io from the noise component Ii' can be achieved satisfactorily provided the selectively non-reciprocal and reciprocal mode conversion regions $a_1$ and $a_2$ can be readily formed in the magneto-optic thin film which constitutes the waveguide path 2. In practice, however, such tandem formation of these regions $a_1$ and $a_2$, which have different magnetization directions, is extremely difficult, requiring the use of large, complex, costly magnetizers, and is a particular hindrance to integration efforts.

The present inventor proposed a method of forming non-reciprocal and reciprocal mode conversion regions in tandem in the waveguide using laser annealing to achieve the requisite localized control of the Ando, "Waveguide magneto-optical isolator fabricated by laser annealing", Appl. Phys. Lett. 53, 4–6, 1988). However, the precision required by the laser annealing makes it a costly fabrication process.

Another proposed method for forming the two regions in tandem involves providing the waveguide with a mirror, whereby non-reciprocal mode conversion is effected in a first region which extends as far as the mirror, utilizing a magneto-optic effect produced by a magnetization direction which is parallel to the direction of light propagation, and stress-induced optical anisotropy between the substrate and the waveguide is used to effect reciprocal mode conversion in a second region arranged at right angles to the propagation direction of light reflected by the mirror (H. Hemme et al.: "Optical isolator based on mode conversion in magnetic garnet films", Applied Optics 26(1987)3811). While this method facilitates magnetization parallel to the direction of light propagation in the first region, a special substrate is needed to achieve the required stress-induced anisotropy in the second region, and it is necessary to apply considerable stress to realize the desired degree of anisotropy. This makes it difficult to obtain good quality thin films for the waveguide and affects the longterm stability of the device.

OBJECT AND SUMMARY OF THE INVENTION

The object of the present invention is therefore to provide a waveguide type unidirectional mode converter and optical isolator in a compact form suitable for integration applications.

Another object of the present invention is to provide a unidirectional mode converter and optical isolator which offers a high level of performance and is also easy to fabricate.

In accordance with the present invention, the above object is attained by a unidirectional mode converter comprising a waveguide in which is formed a Fresnel reflection mirror and the part of the light path from the waveguide input plane to the mirror forms a first region in which magneto-optic-based non-reciprocal mode conversion takes place and the part of the light path from the mirror to the waveguide output plane forms a second region in which reciprocal mode conversion takes place.

The optical isolator according to the present invention comprises polarizers or mode selectors provided in the vicinity of the input and output planes of the above unidirectional mode converter.

In accordance with the above arrangement according to the present invention, as the propagation direction of the light in the waveguide is changed by 90 degrees by the mirror, although the direction of magnetization is the same throughout the waveguide, unidirectional modality is achieved by subjecting the propagating light to the non-reciprocal and reciprocal mode conversion effects.

The polarizers or mode selectors are provided in the vicinity of the input and output planes of th waveguide so that only input light of the prescribed mode is transmitted, the phase of the light is changed when it is reflected by the mirror and the light is then output from the output plane. Any output-mode light which enters the output plane and is reflected by the mirror acquires a phase that is different from the input light phase, and is therefore not transmitted by the mode selector or polarizer on the light input side.

Thus, the optical isolator of this invention has a simple structure which enables it to be fabricated at low cost and is suitable for integration applications.

The above and other objects and features of the invention will become apparent from the following detailed description with reference to the accompanying drawings.

DETAILED DESCRIPTION OF THE PREFERRED EMBODIMENTS

Figure 1:
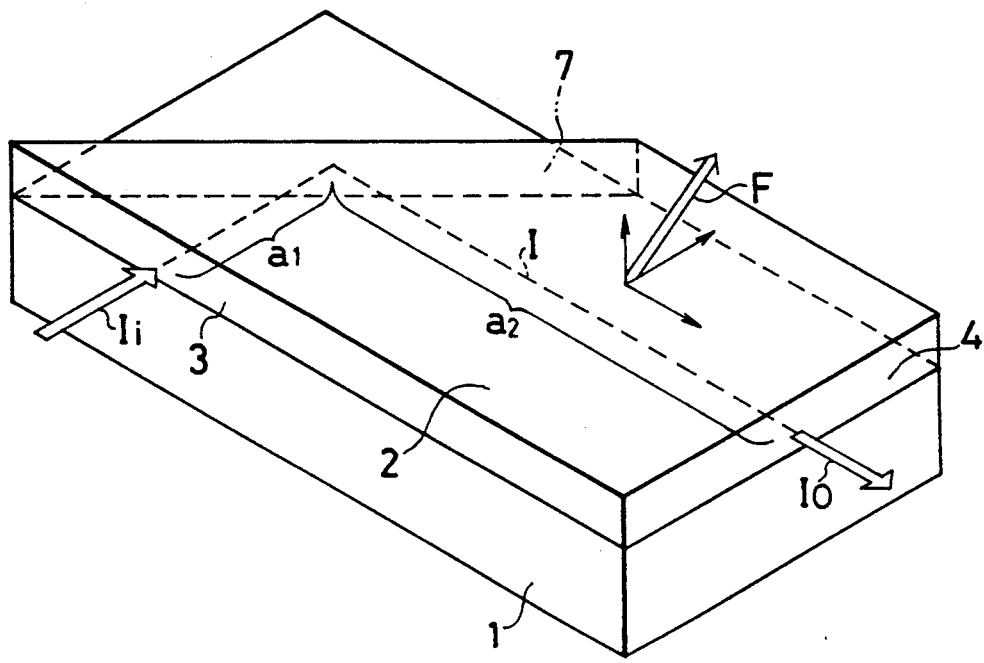
FIG. 1 is a perspective view of an embodiment of the unidirectional mode converter according to the invention.

FIG. 1 shows an embodiment of the unidirectional mode converter arrangement according to the present invention. With reference to the drawing, an optical waveguide path 2 is formed on a rectangular substrate 1, with one of the long sides forming an input plane 3 and one of the short sides an output plane 4. At the point of intersection between the input and output light paths of the waveguide path 2 is provided a Fresnel reflection mirror 7, arranged at an angle of 45 degrees to each light path.

In accordance with this arrangement, the propagation direction of light Ii entering via the input plane 3 is deflected 90 degrees by the mirror 7 and exits from the output plane 4. The Fresnel reflection mirror 7 arranged at an angle in the waveguide path 2 on the substrate 1 is formed by a suitable method including for example chemical etching, ion-beam etching, laser etching, and polishing of the face and substrate.

The magnetization direction F for the L-shaped waveguide path 2 is selected so that in the first region $a_1$ comprised of the part from the input light Ii input plane 3 to the mirror 7, none of the components along the plane of the waveguide path 2 are perpendicular to the propagating direction of the propagating light I and, moreover, in the second region $a_2$ comprised of the part from the mirror 7 to the output plane 4 of the propagating light I does not have any components traveling parallel to the light propagation direction.

With this above arrangement, therefore, even though the direction of magnetization F is the same in both of the regions $a_1$ and $a_2$ of the waveguide, as this magnetization direction F and the propagation direction of the light I are different, the first region $a_1$ functions as a Faraday effect non-reciprocal mode conversion region and the second region $a_2$ functions as a Cotton-Mouton effect reciprocal mode conversion region. Also, in addition to changing the propagation direction of the light I, the mirror 7 provided in the waveguide path 2 also has a Fresnel reflection effect which changes the phase of the propagating light I.

Thus, the polarization of the input light Ii that enters the waveguide path 2 via the input plane 3 is changed by the Faraday-effect induced non-reciprocal mode conversion that takes place in the first region $a_1$. Under ideal conditions, there will be a difference of 45 degrees between the orientation of the input light polarization and the axial orientation of the polarization ellipses. The Fresnel reflection of the mirror 7 causes a further change in the polarization. Under ideal conditions, this reflection will only change the degree of the ellipse and will not produce any axial change in the polarization ellipses. Following this, in the second region $a_2$ the Cotton-Mouton effect induces a change in the polarization to the same linear polarization as the input light (or to a linear polarization perpendicular thereto), in which state the light arrives at the output plane 4.

In the same way, light entering via the output plane 4 and propagating back along the same light path is given a linear polarity that is perpendicular (or parallel) to the linear polarity of the light upon its entry via the output plane 4, in which state it arrives at the waveguide path 2. A study of the operating characteristics of the waveguide showed that this structure functions as a unidirectional mode converter.

It was found that with a waveguide path 2 consisting of a thin film of $(BiGdLu)_3(FeGa)_5O_{12}$ formed on a substrate 1 of $Gd_3Ga_5O_{12}$ crystal, a magnetization direction tilted 45 degrees from the normal of the thin film and a TE-TM phase constant differential of 0.95 rad/cm, the TM conversion efficiency is no more than 0.01%, so TE-mode input light Ii is output as output light Io virtually unchanged, while 99.999% of TE-mode light input via the output plane 4 and output via the input plane 3 underwent TM-mode conversion.

It is considered that the above TE-TM mode conversion of over 99% in the case of backward traveling light is the result of using a waveguide material having a large magneto-optic constant, appropriate parameter values, and optimum fine adjustment of the direction of magnetic moment with respect to the external magnetic field.

A compact, highly efficient optical isolator can be realized by replacing the Bi in the above waveguide material with a substance such as magnetic garnet or the like which exhibits a strong magneto-optic effect. All magnetization angles are effective except those which mean the magnetization will be perpendicular or parallel to the waveguide. The size of the device depends on the size of the magneto-optic constant, the differentiation between the phase constants of the TE and TM modes and other such factors, and should be determined accordingly. In the device arranged according to the invention, the main factor in reducing the light propagation length is the magnetization tilt setting of 45 degrees or thereabouts, which enables the Cotton-Mouton effect to be utilized most effectively.

Figure 3:
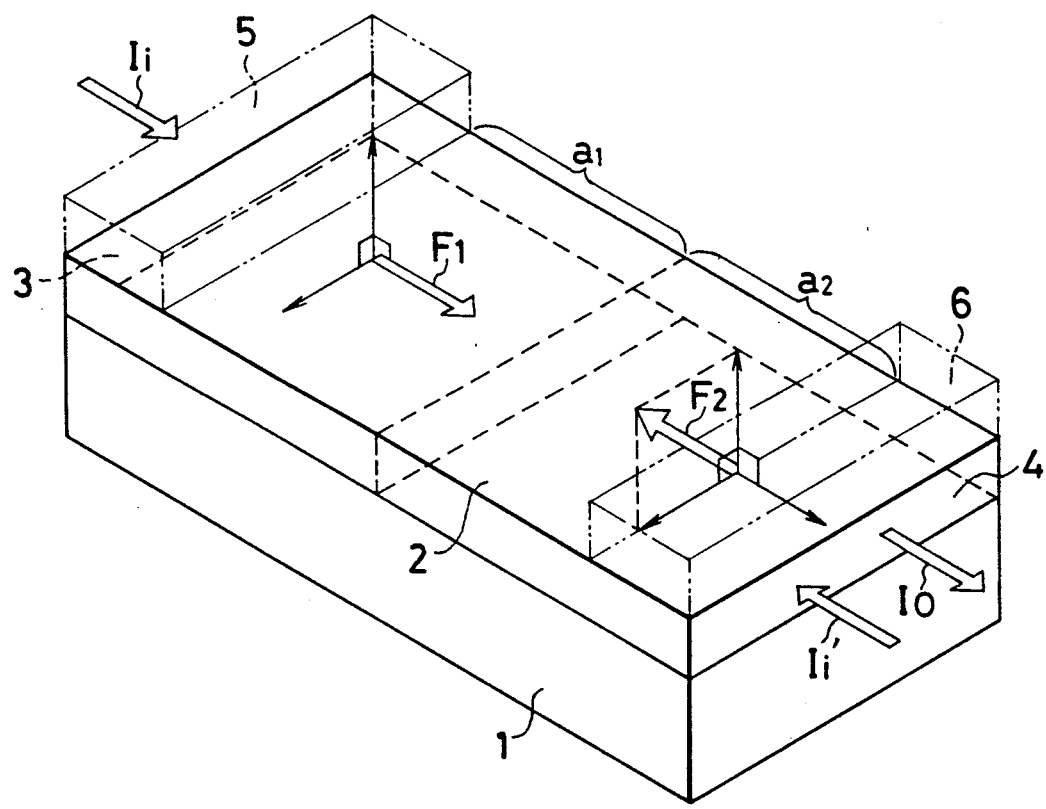
FIG. 3 is a perspective view of a typical waveguide cal isolator according to the prior art.

Also, unlike the prior art arrangement shown in FIG. 3 in which a straight waveguide is used, the embodiment of the invention as shown in FIG. 1 has a number of advantages. For example, as the reflection of the mirror 7 can be used to appropriately change the phase of the light I, deviation from the design values of the magnetization tilt angle and thickness of the waveguide path 2 causes less degradation in device performance, and the light propagation length can be shortened to the minimum required for the application. For example, if the substrate and thin film of the above embodiment is used to fabricate the conventional unidirectional mode converter arrangement shown in FIG. 3, the light propagation length would have to be 7.1 mm, which in the case of the arrangement of this invention could be reduced to 4.3 mm.

Another embodiment of the present invention will now be described with reference to FIG. 2. With reference to the drawing, an optical waveguide path 2 is formed on a rectangular substrate 1, with one of the long sides forming an input plane 3 and one of the short sides an output plane 4. At the point of intersection between the input and output light paths of the waveguide path 2 is provided a Fresnel reflection mirror 7, arranged at an angle of 45 degrees to each light path. This part of the arrangement is therefore substantially identical to the mode converter shown in FIG. 1, and here also, formed on the waveguide path 2 in the vicinity of the input and output planes 3 and 4 are polarizers or mode selectors 5 and 6.

The simplest way to form these polarizers or mode selectors 5 and 6 is by vapor deposition of a metal layer at the waveguide planes 3 and 4. The layers can be deposited directly onto the planes or with a thin film of insulation therebetween; the layers are selected to absorb or transmit the prescribed light modes as required. If required by the particular optical isolator application, separate polarizers or mode selectors 5 and 6 of a known design may be provided at both planes.

With this arrangement, as already described above, the polarizers, which selectively absorb light of a prescribed mode, and mode selectors, which transmit the light, provided in the vicinity of the input and output planes of the waveguide ensure the passage only of input light of the prescribed mode, and any noise light which enters via the output plane 4 is blocked or absorbed.

Figure 2:
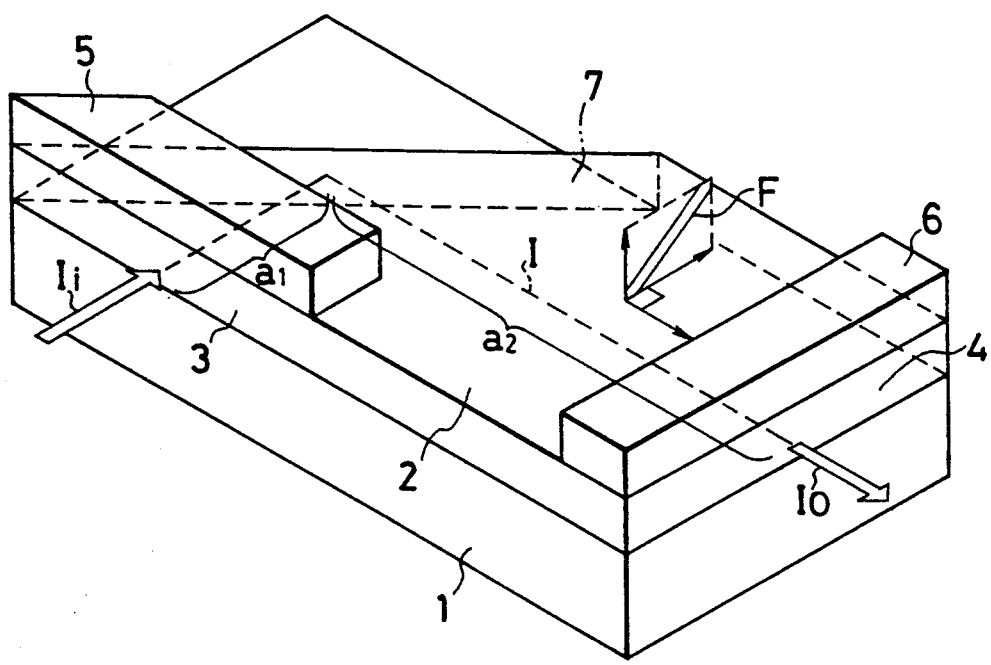
FIG. 2 is a perspective view of an embodiment of the optical isolator of the invention.

While the arrangement described with reference to FIGS. 1 and 2 is that in which the device comprises three layers, which are the substrate 1, waveguide path 2, and an air layer (cladding layer), it may be formed as a multiplicity of material layers above and below the waveguide layer in order to adjust the phase constant or for single-mode waveguide operation. Again, while the description was made with reference to a first region $a_1$ which only performs non-reciprocal mode conversion and a second region $a_2$ which only performs reciprocal mode conversion, the non-reciprocal mode conversion region may include some mode conversion and vice-versa without departing from the gist of the invention. Also, the parameter values can be changed over to convert the input plane 3 to the output plane 4 and vice-versa.

What is claimed is:

1. A unidirectional mode converter comprising:
   a first waveguide path having an input plane at one end;
   a second waveguide path arranged at right angles to the first waveguide path and having an output plane at one end;
   a Fresnel reflection mirror provided at the point of intersection between the first and second waveguide paths at an angle of 45 degrees to each waveguide path;
   magnetization means for magnetizing each of the first and second waveguide paths so that the direction of magnetization of each of the paths differs from the direction of light propagation along each path;
   whereby the first waveguide path forms a Faraday-effect-induced non-reciprocal mode conversion region and the second waveguide path forms a Cotton-Mouton-effect-induced reciprocal mode conversion region.

2. A unidirectional mode converter according to claim 1 in which the tilt angle of the magnetization by the magnetization means is 45 degrees.

3. An optical isolator comprising:
   a first waveguide path having an input plane at one end;
   a second waveguide path arranged at right angles to the first waveguide path and having an output plane at one end;
   a Fresnel reflection mirror provided at the point of intersection between the first and second waveguide paths at an angle of 45 degrees to each waveguide path;
   magnetization means for magnetizing each of the first and second waveguide paths so that the direction of magnetization of each of the paths differs from the direction of light propagation along each path;
   a mode selector provided at the input plane of the first waveguide path; and
   a mode selector provided at the output plane of the second waveguide path.

4. An optical isolator according to claim 3 in which the mode selectors provided at the input and output planes are of metal which selectively transmits prescribed light modes.

5. An optical isolator comprising:
   a first waveguide path having an input plane at one end;
   a second waveguide path arranged at right angles to the first waveguide path and having an output plane at one end;
   a Fresnel reflection mirror provided at the point of intersection between the first and second waveguide paths at an angle of 45 degrees to each waveguide path;
   magnetization means for magnetizing each of the first and second waveguide paths so that the direction of magnetization of each of the paths differs from the direction of light propagation along each path;
   a polarizer provided at the input plane of the first waveguide path; and
   a polarizer provided at the output plane of the second waveguide path.

6. An optical isolator according to claim 5 in which the polarizers provided at the input and output planes are of metal which selectively absorbs prescribed light modes.

* * * * *